United States Patent
Noto

(10) Patent No.: US 7,742,097 B2
(45) Date of Patent: Jun. 22, 2010

(54) OPTICAL DEVICE AND CONTROL METHOD THEREOF

(75) Inventor: Goro Noto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1280 days.

(21) Appl. No.: 11/255,317

(22) Filed: Oct. 20, 2005

(65) Prior Publication Data

US 2006/0087584 A1    Apr. 27, 2006

(30) Foreign Application Priority Data

Oct. 22, 2004   (JP)   ............................. 2004-308494

(51) Int. Cl.
  *H04N 5/225* (2006.01)
  *G02B 13/16* (2006.01)
(52) U.S. Cl. .................................................. 348/335
(58) Field of Classification Search ................. 348/335
  See application file for complete search history.

(56) References Cited

U.S. PATENT DOCUMENTS

| | | | |
|---|---|---|---|
| 6,327,085 B1 | 12/2001 | Osawa et al. | |
| 7,492,408 B2 * | 2/2009 | Ito | 348/335 |
| 2001/0055072 A1* | 12/2001 | Mogamiya et al. | 348/335 |
| 2003/0202114 A1* | 10/2003 | Takizawa et al. | 348/335 |
| 2004/0012714 A1* | 1/2004 | Kawai | 348/374 |
| 2005/0052759 A1 | 3/2005 | Ito et al. | |

FOREIGN PATENT DOCUMENTS

| | | |
|---|---|---|
| JP | 2001-298640 A | 10/2001 |
| JP | 2002-271662 | 9/2002 |
| JP | 2003-5254 | 1/2003 |

OTHER PUBLICATIONS

European Search Report dated Mar. 8, 2006.
Communication from European Patent Office dated Mar. 28, 2006. The above reference was cited in a Mar. 28, 2006 Partial European Search Report (copy enclosed) of the counterpart European Patent Application No. 05023074.7.

* cited by examiner

*Primary Examiner*—Sinh Tran
*Assistant Examiner*—Anthony J Daniels
(74) *Attorney, Agent, or Firm*—Cowan, Liebowitz & Latman, P.C.

(57) ABSTRACT

Provided is an optical device having image capturing means that converts an optical image of an object to an electric signal, and an optical element arranged before the image capturing means. In the optical device, an insulation member is arranged at a position facing the optical element in a way to be movable in a substantially entire area of a light entering surface of the optical element, and an electric control unit is provided for at least electrostatically charging or neutralizing the insulation member.

8 Claims, 12 Drawing Sheets

OPTICAL DEVICE AND CONTROL METHOD THEREOF

FIELD OF THE INVENTION

The present invention relates to an optical device of a digital camera or the like, and more specifically, to a technique of removing dust attached to the surface of an optical member arranged on or in the neighborhood of a focal plane, such as a solid-state image capturing device, an optical filter, a lens or the like incorporated in the optical device.

BACKGROUND OF THE INVENTION

Conventionally it has been problematic when dust or the like exists in the neighborhood of the focal plane of a photograph lens of a digital single reflex camera with interchangeable lenses, because the solid-state image capturing device captures the shadow of the dust. It is believed that such dust comes into the lens from outside at the time of lens exchange, or is caused by microscopic abrasion powder of a resin or the like serving as a structural member of the camera, which is generated along with an operation of a shutter or mirror inside the camera. If the dust generated by such causes gets in between a protection cover glass of the solid-state image capturing device and an optical filter, such as an infrared-ray filter or an optical low-pass filter (hereinafter referred to as an LPF) arranged on the entire surface of the cover glass, the camera must be taken apart to remove the dust. For this reason, it is extremely effective to have a sealing structure to prevent dust from getting in between the cover glass and the optical filter of the solid-state image capturing device.

However, in a case where dust is attached to the surface of the optical filter that is opposite to the solid-state-image-capturing-device facing side, if the dust is in the neighborhood of the focal plane, a problem still remains in that the shadow of the dust is captured by the solid-state image capturing device.

To solve the above problem, there is a technique for cleaning the cover glass surface of the solid-state image capturing device with a wiper (e.g., refer to Japanese Patent Application Laid-Open (KOKAI) No. 2003-005254 (page 8, FIGS. 1 and 9)).

According to the camera structure described in KOKAI No. 2003-005254, it is possible to remove dust attached to the cover glass surface of the solid-state image capturing device or the outermost surface of a dust control structure without removing the lens or taking the camera apart.

However, because the cover glass surface of the solid-state image capturing device or the outermost surface of the dust control structure is rubbed by the wiper, in a case of hard dust such as metal powder, there is a risk of scratching the cover glass surface of the solid-state image capturing device or the outermost surface of the dust control structure. Furthermore, because the dust removed by the wiper floats in the camera, it is problematic that the dust that has once been removed is attached again to the cover glass surface of the solid-state image capturing device or the outermost surface of the dust control structure.

Besides the above, there is a structure that prevents dust attachment to the surface of an image capturing device by utilizing cleaning film inserted between a focal plane shutter and the image capturing device (e.g., Japanese Patent Application Laid-Open (KOKAI) No. 2002-271662 (page 7, FIG. 7)). More specifically, when dust is attached to the cleaning film, the portion of film is taken up to remove the dust attached to the surface. Accordingly, it is possible to remove dust without scratching the image capturing device surface.

However, since this structure requires space for loading and taking up the cleaning film, and also requires an exchange of the cleaning film at appropriate timing, it causes problems of an enlarged size of the camera and a complicated operation.

SUMMARY OF THE INVENTION

The present invention has been proposed in view of the above-described conventional problems. The object of the present invention is to realize an optical device that can remove dust attached to an optical device adjacent to an image capturing element while reducing to scratch the surface of the optical device.

In order to attain the above-described object, the first aspect of the present invention provides an optical device comprising an image capturing unit adapted to convert an optical image of an object to an electric signal and an optical element arranged before the image capturing unit, wherein an insulation member is arranged at a position facing the optical element in a way to be movable in a substantially entire area of a light entering surface of the optical element, and an electric control unit is provided for at least one of electrostatically charging and neutralizing the insulation member.

The second aspect of the present invention provides an optical device comprising an image capturing unit adapted to convert an optical image of an object to an electric signal, wherein an insulation member is arranged at a position facing the image capturing unit in a way to be movable in a substantially entire area of a light entering surface of the image capturing unit, and an electric control unit is provided for at least one of electrostatically charging and neutralizing the insulation member.

The third aspect of the present invention provides an optical device comprising a shutter device including a pair of boards where an aperture is formed in the substantially central portion as an object light path and a shutter blade arranged between the boards for opening or closing the aperture, an image capturing unit adapted to convert an optical image of an object to an electric signal, and an optical element arranged before the image capturing unit, wherein an insulation member is arranged on the shutter blade at a position facing the optical element, and an electric control unit is provided between the shutter blade and the optical element for at least one of electrostatically charging and neutralizing the insulation member.

The fourth aspect of the present invention provides an optical device comprising a shutter device including a pair of boards where an aperture is formed in the substantially central portion as an object light path and a shutter blade arranged between the boards for opening or closing the aperture, and an image capturing unit adapted to convert an optical image of an object to an electric signal, wherein an insulation member is arranged on the shutter blade at a position facing the image capturing unit, and an electric control unit is provided between the shutter blade and the image capturing unit for at least one of electrostatically charging and neutralizing the insulation member.

The fifth aspect of the present invention provides an optical device and a control method thereof, the optical device comprising a shutter device including a pair of boards where an aperture is formed in the substantially central portion as an object light path and a shutter blade arranged between the boards for opening or closing the aperture, an image capturing unit adapted to convert an optical image of an object to an electric signal, and an optical element arranged before the image capturing unit, wherein the shutter blade can be switched at least between a first operation speed and a second operation speed, and the optical device can be switched at least between a cleaning mode where the shutter blade is driven to an open state thereby exposing a surface of the optical element or the image capturing unit, and an image capturing mode where image capturing of an object is performed, wherein in the cleaning mode the optical device causes the shutter blade to operate at the first operation speed, and in the image capturing mode the optical device causes the shutter blade to operate at the second operation speed.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, a digital single reflex camera with interchangeable lenses (hereinafter referred to as a D-SLR), which is adopted as the best mode for realizing the present invention, is described in detail with reference to the accompanying drawings.

Note that the following embodiments are given as an example of means realizing the present invention, thus should be corrected or modified appropriately in accordance with various conditions and configurations of an apparatus to which the present invention is applied. Therefore, the present invention is not limited to the following embodiments.

Furthermore, it goes without saying that the present invention can be achieved by providing a storage medium (or a recording medium), storing program codes of software realizing functions of respective devices described in the following embodiments, to a computer system or apparatus, reading the program codes from the storage medium by a system or apparatus computer (CPU or MPU), and executing the program.

First Embodiment

Figure 1:
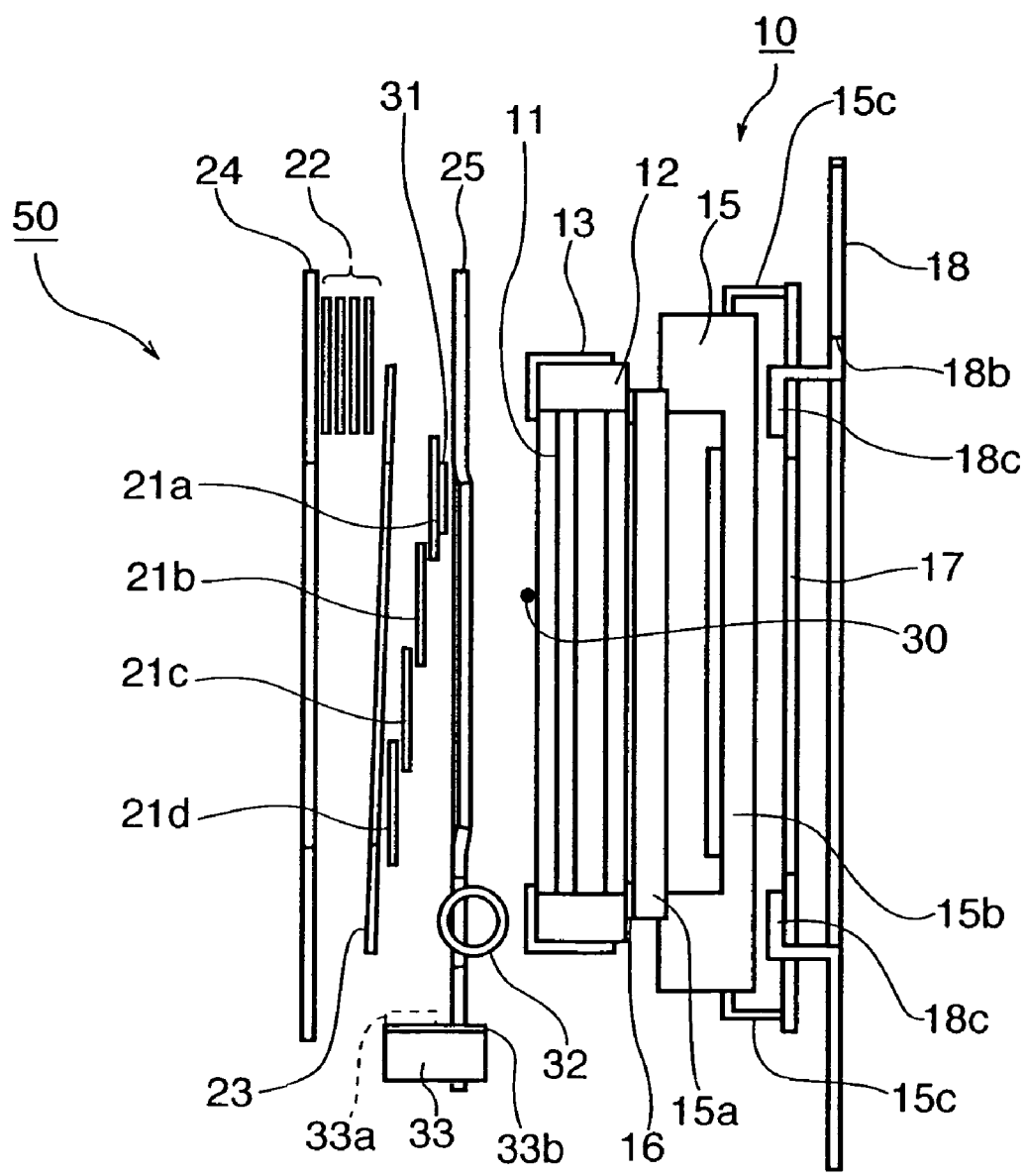
FIG. 1 is a cross-section seen from the side for describing a brief configuration of an image capturing unit 10 and a focal plane shutter 50 according to the first embodiment of the present invention.
Figure 2:
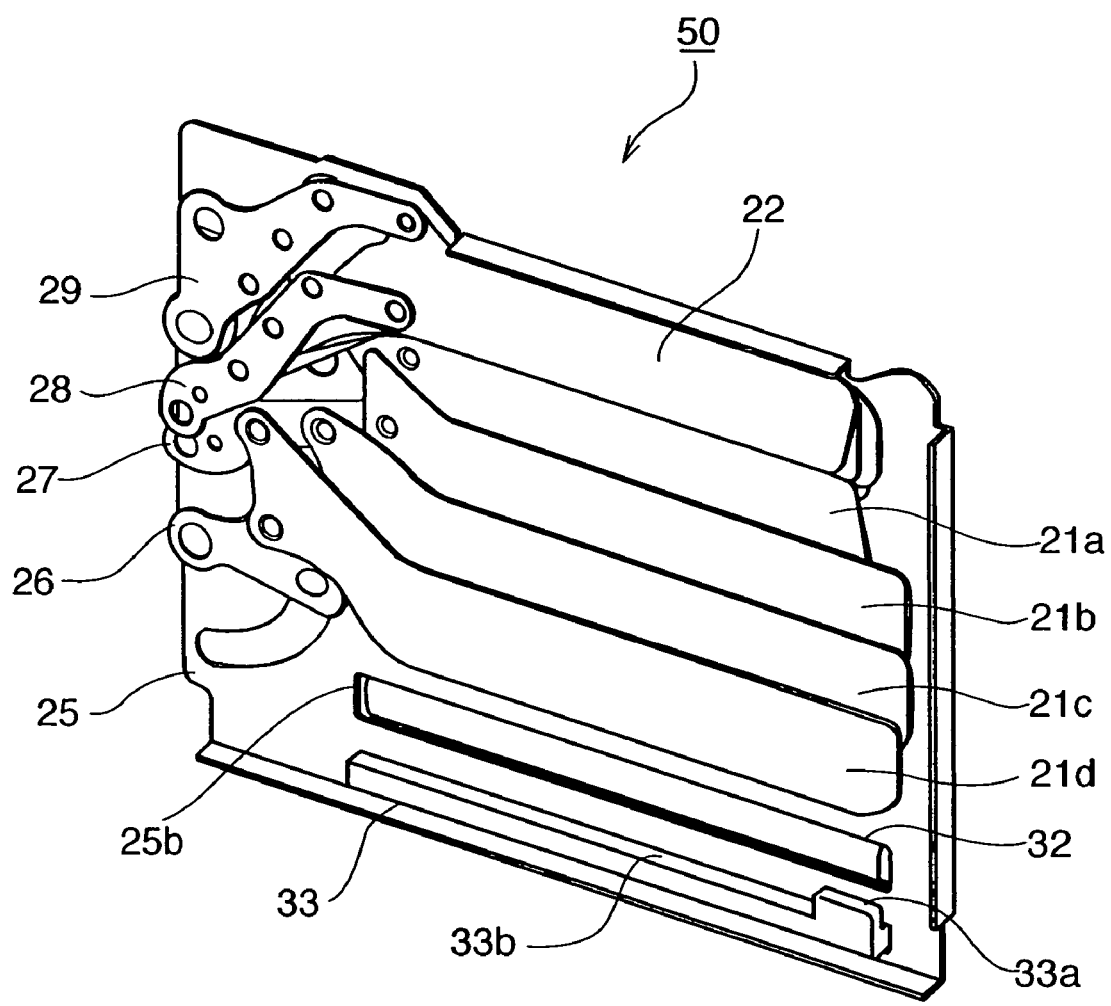
FIG. 2 is a perspective view seen from the front for describing a brief configuration of a front blade 21 of the focal plane shutter 50 according to the first embodiment of the present invention.
Figure 3:
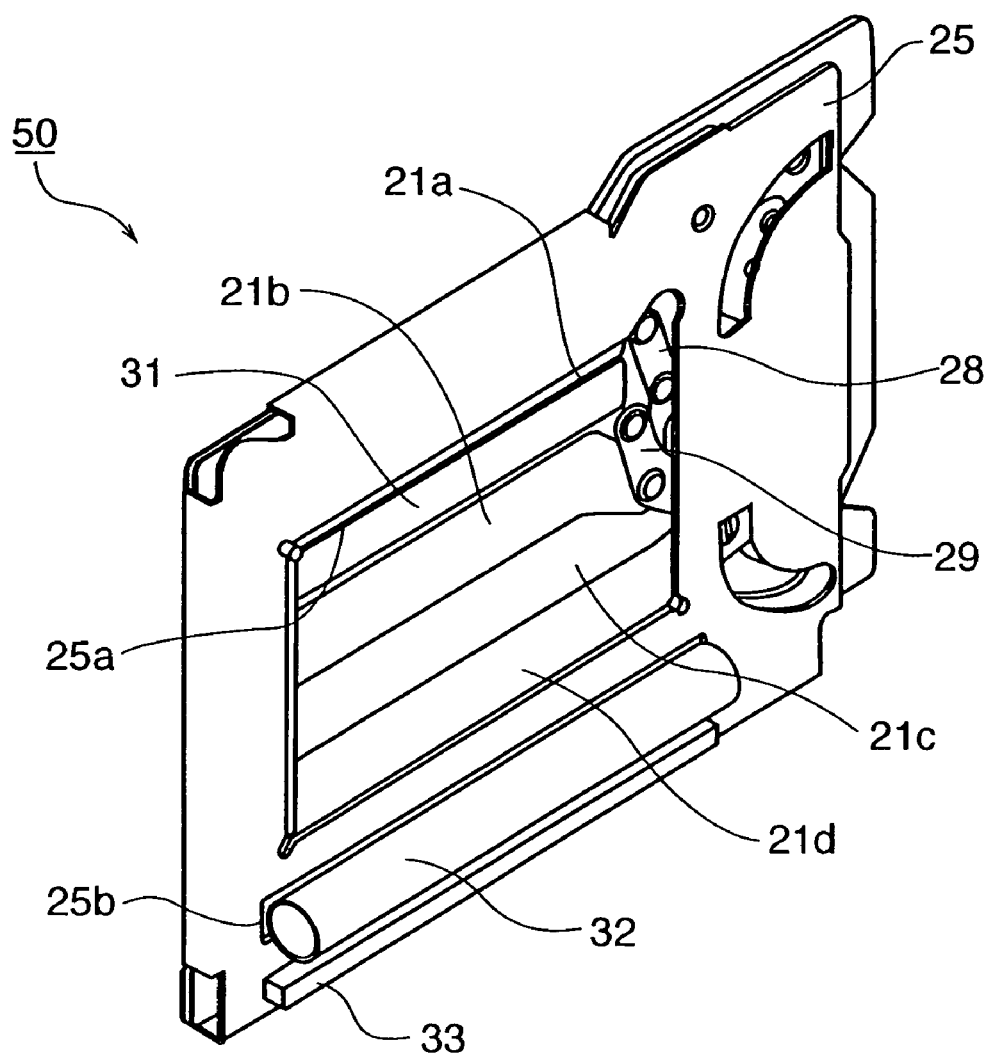
FIG. 3 is a perspective view seen from the rear for describing a brief configuration of the image capturing unit 10 and the focal plane shutter 50 according to the first embodiment of the present invention.
Figure 4:
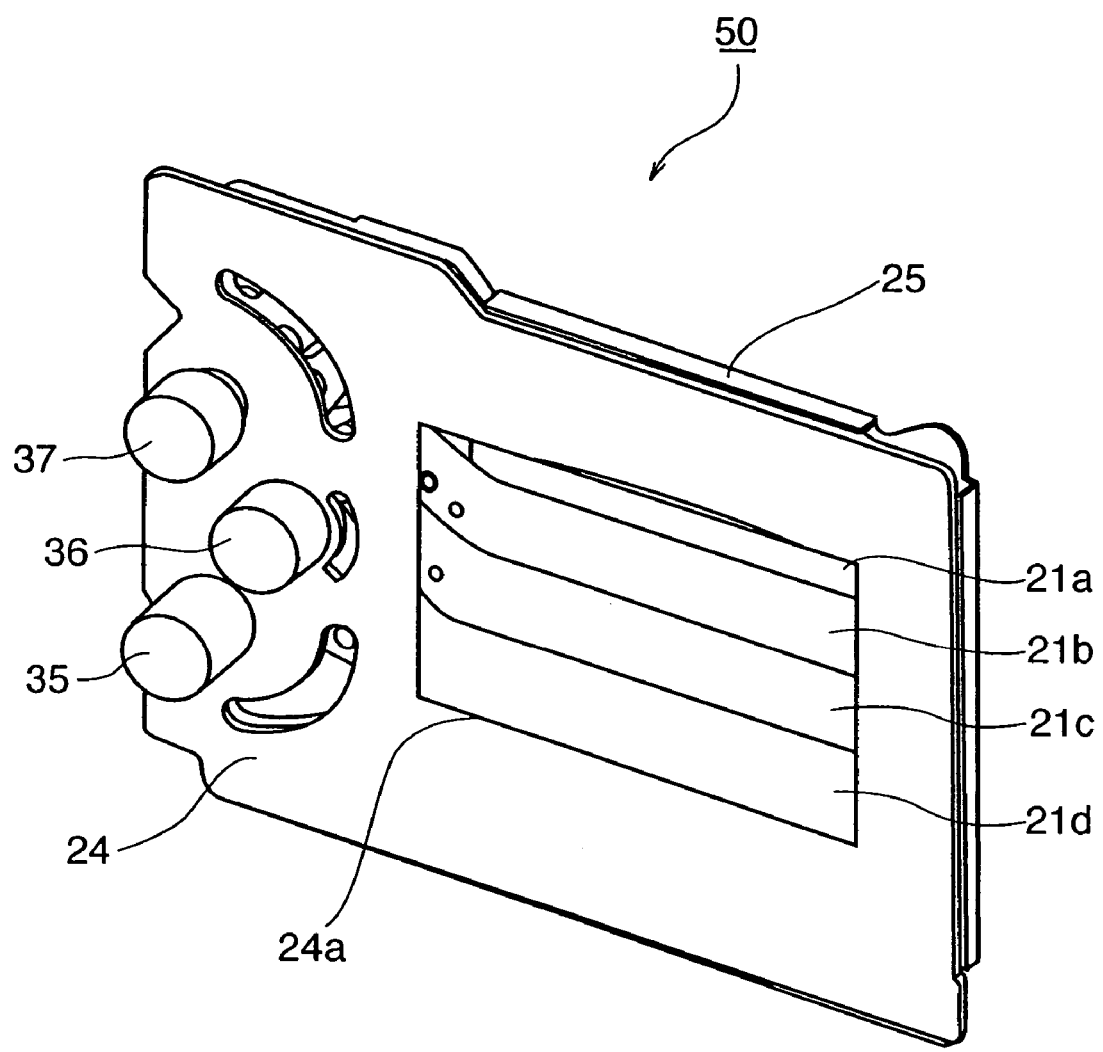
FIG. 4 is a perspective view seen from the front for describing a brief configuration of the focal plane shutter 50 according to the first embodiment of the present invention.
Figure 5:
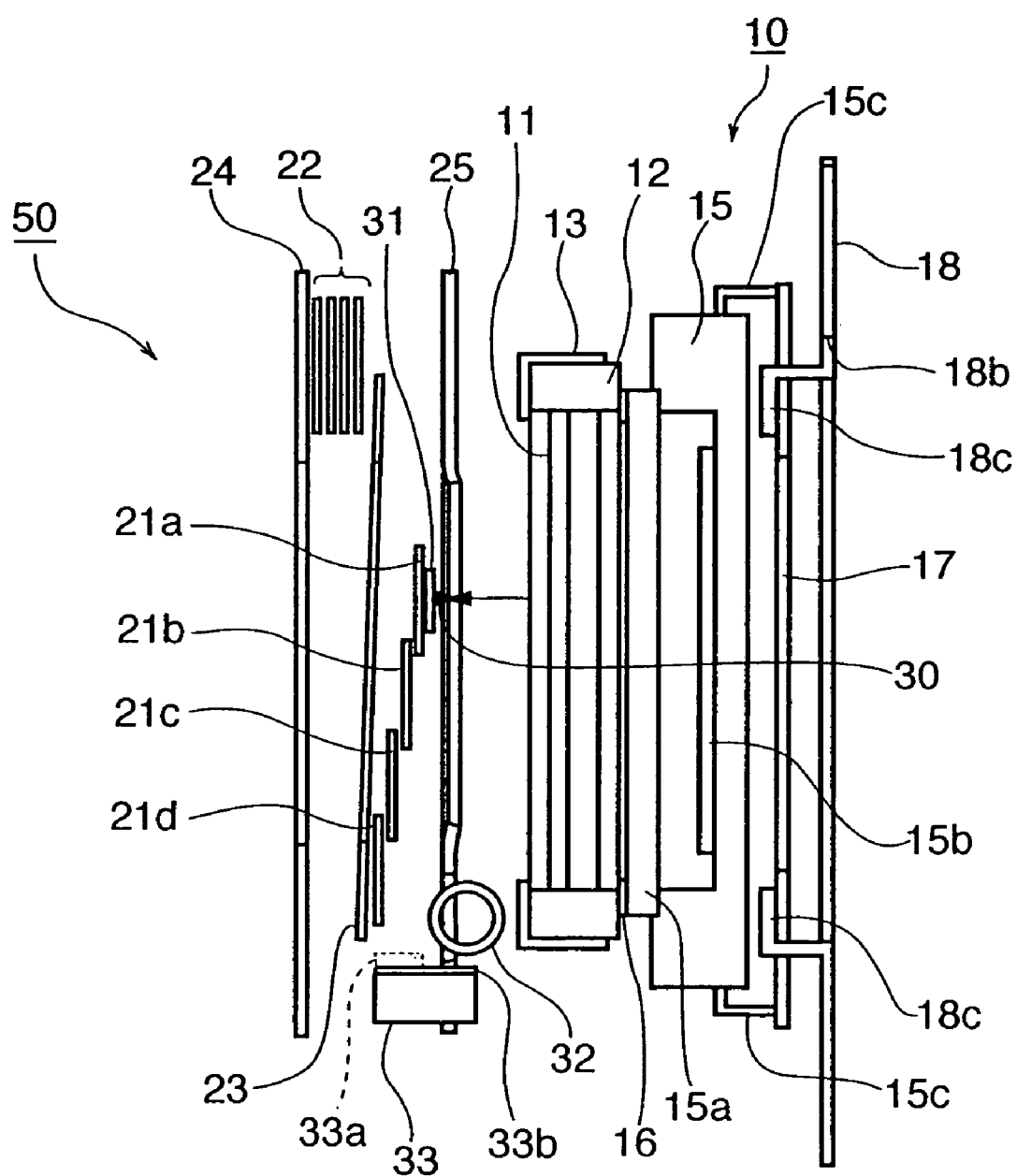
FIG. 5 is a cross-section seen from the side for describing a brief configuration of the image capturing unit 10 and the focal plane shutter 50 when the front blade 21 is performing an opening operation according to the first embodiment of the present invention.
Figure 6:
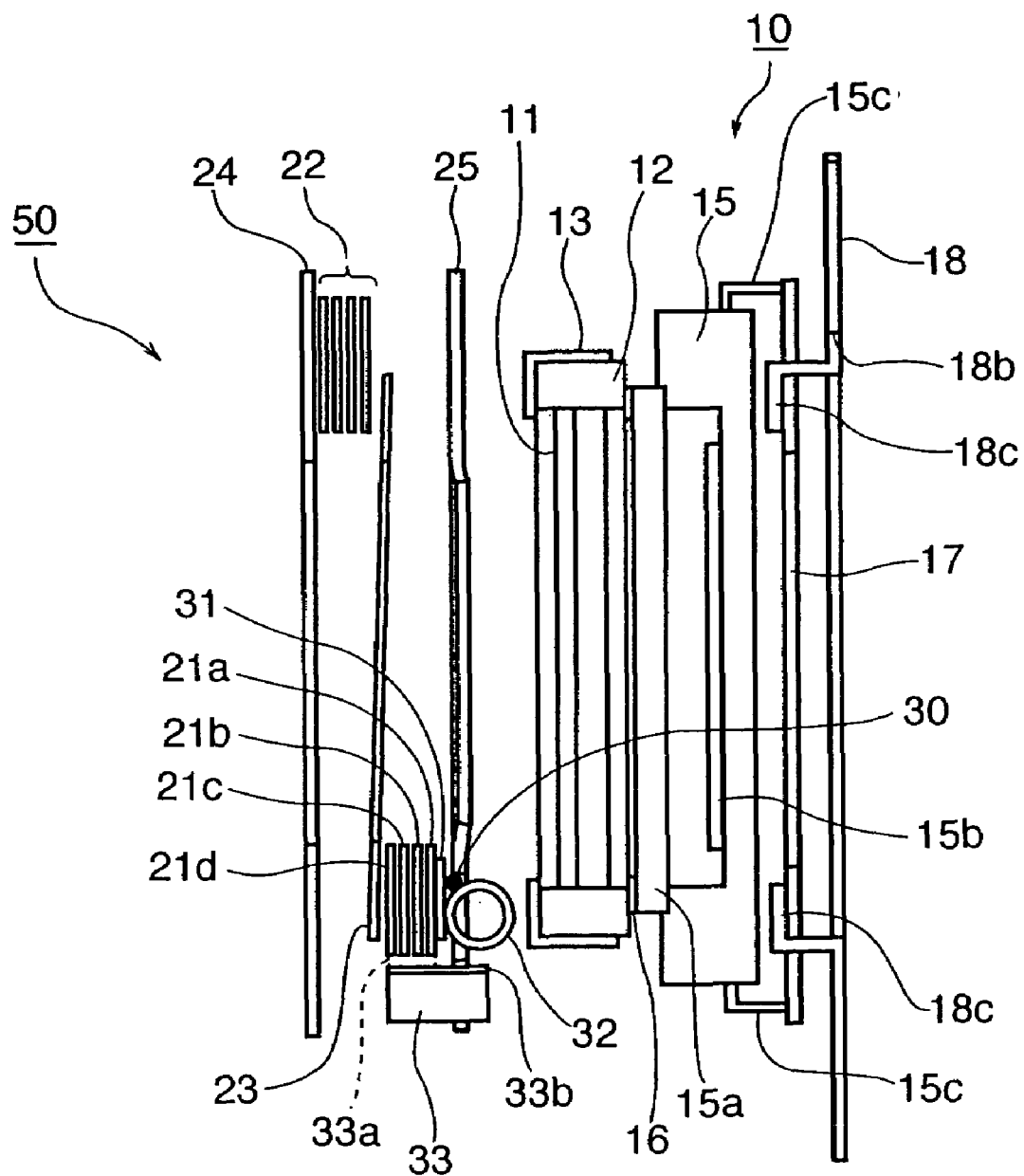
FIG. 6 is a cross-section seen from the side for describing a brief configuration of the image capturing unit 10 and the focal plane shutter 50 when the front blade 21 completes the opening operation according to the first embodiment of the present invention.

FIG. 1 is a cross-section seen from the side for describing a brief configuration of an image capturing unit 10 and a focal plane shutter 50 of the D-SLR100 according to the first embodiment of the present invention. FIG. 2 is a perspective view seen from the front for describing the main portion of the focal plane shutter 50. FIG. 3 is a perspective view seen from the rear of the focal plane shutter 50 (a perspective view seen from the image capturing unit 10). FIG. 4 is a perspective view seen from the front of the focal plane shutter 50. FIGS. 5 and 6 are cross-sections seen from the side for describing an operation of the focal plane shutter 50.

In FIGS. 1 to 6, the image capturing unit 10 is mainly configured with the following members: an optical element 11, a supporting plate 13 integrating the optical element 11 and a holding member 12 while being pressed against the surface of the optical element 11 and the holding member 12 that holds the optical element 11, a solid-state image capturing device 15 configured with a cover member 15a for protecting a solid-state image capturing element 15b, a sealing member 16 for sealing a gap between the cover member 15a of the solid-state image capturing device 15 and the optical element 11, a substrate 17 which is connected to a connection terminal 15c of the solid-state image capturing device 15 and which incorporates an electric element constituting the control circuit for controlling an operation of the D-SLR100, and a holding plate 18 united with the solid-state image capturing device 15 for fixing the solid-state image capturing device 15 to chassis (not shown) of the D-SLR100 with screws (not shown).

Meanwhile, the focal plane shutter 50 is configured with the following members: a front blade 21 having plural shutter blades 21a to 21d, a rear blade 22 similarly having plural shutter blades, an intermediate plate 23 that divides the driving space of the front blade 21 and the rear blade 22 in the focal plane shutter 50, a pressing plate 24 of the rear blade 22 which includes an opening 24a in the virtually central portion for image capturing, and a cover plate 25 serving as a pressing plate of the front blade 21 which includes an opening 25a in the virtually central portion for image capturing.

Numeral 26 denotes a driving lever driven by a front blade driving source 35, which will be described later, to open the front blade 21 for exposing the openings 24a and 25a from the state shown in FIGS. 1 to 4. Numeral 27 denotes a charge lever which performs an opening operation of the front blade 21 together with the driving lever 26, and also performs a closing operation of the front blade 21 to close the opened front blade 21 to the closed state shown in FIGS. 1 and 2 by being driven by a charge driving source 36 which will be described later. Numerals 28 and 29 are rear blade driving levers for performing an opening or closing operation of the rear blade by being driven by a rear blade driving source 37 which will be described later.

In other words, the shutter blades 21a to 21d constituting the front blade 21 integrally perform the opening or closing operation by the front blade driving lever 26 and the charge lever 27. Also, respective shutter blades constituting the rear blade 22 integrally perform the opening or closing operation by the rear blade driving levers 28 and 29.

Numeral 30 denotes dust attached to the surface of the optical element 11.

Numeral 31 denotes an insulator such as polyimide integrated with shutter blades 21a; 32, a coil for electrostatically charging or neutralizing the insulator 31; and 33, a stopper rubber including a stopper member 33a serving as a stopper of the shutter blades 21a to 21d of the front blade 21 when they are open.

Numeral 35 denotes a front blade driving source (shown in a simplified form) constructed with a driving lever and an electromagnetic actuator configured with a well-known coil, yoke or the like. Numeral 36 denotes a charging source (shown in a simplified form) configured with a driving lever, a spring or the like, for performing a closing operation to close the opened front blade 21 to the closed state shown in FIGS. 1 and 2. Numeral 37 denotes a rear blade driving source (shown in a simplified form) constructed with a driving lever and an electromagnetic actuator configured with a well-known coil, yoke or the like. By the control of the front blade driving source 35, the charging source 36, and the rear blade driving source 37, it is possible to vary the speed of an opening or closing operation of the front blade 21 and the rear blade 22.

Figure 7:
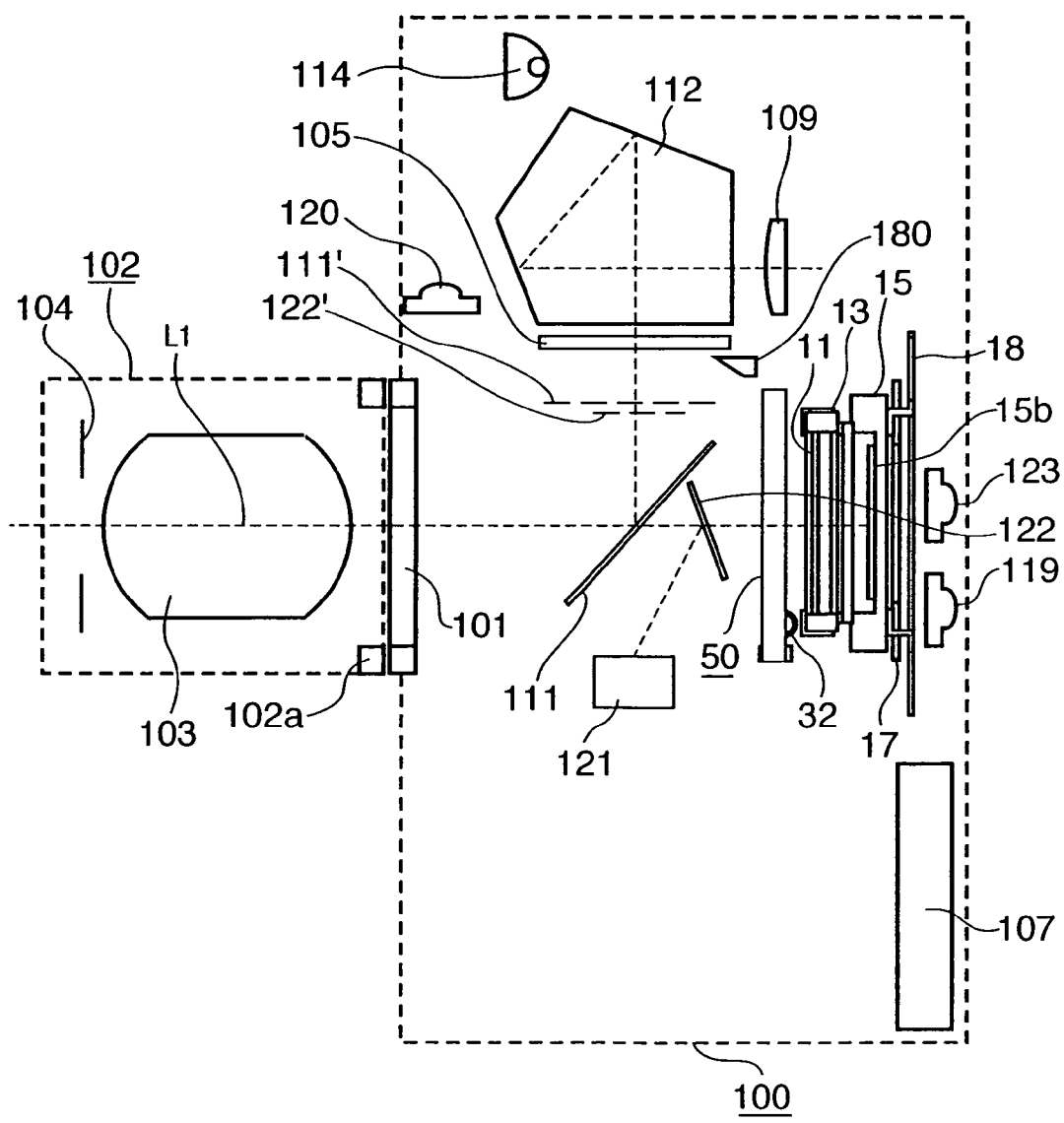
FIG. 7 is a view showing a brief configuration of a camera system D-SLR100 according to the first embodiment of the present invention.

FIG. 7 shows a brief configuration of the camera system D-SLR100 according to the first embodiment. The camera system comprises a camera main unit (image capturing device) and a lens device which is detachably mounted to the camera main unit.

The D-SLR100 is a single-plate digital camera utilizing an image capturing device such as a CCD or a CMOS sensor. The image capturing device is driven continuously or singly to obtain image signals indicative of a moving image or a still image. Herein, the image capturing device is an area sensor which stores charges corresponding to a photoreceptive amount by converting exposed light to an electric signal in units of pixel, and reads the stored charges.

Referring to FIG. 7, numeral 100 denotes the D-SLR100; and 101, a mounting mechanism for mounting a detachable lens device 102 to the D-SLR100. Through this mounting mechanism 101, the lens device 102 is electrically and mechanically connected to the D-SLR100. By mounting a lens device 102 having different focal length, it is possible to obtain photograph screens having various field angles.

In the light path L1 from a photographing optical system 103 of the lens device 102 to the solid-state image capturing device 15, the optical element 11 is provided to limit the cut-off frequency of the photographing optical system 103, so as not to transmit to the solid-state image capturing device 15 a spatial frequency component of an object image (optical image) that is higher than necessary.

Signals read out of the solid-state image capturing device 15 are subjected to predetermined processing, which will be described later, and displayed on a display unit 107 as image data. The display unit 107, arranged on the back surface of the D-SLR100, can be directly viewed by a user.

By realizing the display unit 107 with an organic electroluminescent (EL) spatial modulation element, a liquid crystal spatial modulation element, or a spatial modulation element utilizing electrophoretic migration of microparticles, it is possible to reduce power consumption and realize thinning of the display unit 107. Accordingly, power saving and downsizing of the D-SLR100 can be achieved.

The solid-state image capturing device 15 is, more specifically, a CMOS process-compatible sensor (hereinafter referred to as a CMOS sensor), which is one of an amplifying-type solid-state image capturing device. As one of the features of the CMOS sensor, peripheral circuits such as a MOS transistor and an image capturing device driving circuit of the area sensor portion, an AD conversion circuit, an image processing circuit and the like can be formed in one same process. Therefore, the number of masks and process steps can largely be reduced compared to a CCD. Further, it is also the feature of the CMOS sensor that it is possible to randomly access an arbitrary pixel. Therefore, reading data while thinning the data for displaying is easy, and real-time displaying can be performed at a high display rate in the display unit 107.

By utilizing the above-described features, the solid-state image capturing device 15 performs a display-image output operation (reading data from the partially thinned-out area of the photoreceptive area of the solid-state image capturing device 15) and a high-definition image output operation (reading data from all the photoreceptive area).

Numeral 111 denotes a movable half mirror that reflects part of light beams from the photographing optical system 103 and transmits the rest. The half mirror 111 has a refractive index of about 1.5, and a thickness of 0.5 mm. Numeral 105 denotes a focusing screen arranged on a planned image forming surface of an object image formed by the photographing optical system. Numeral 112 denotes a penta prism. Numeral 109 denotes a finder lens, consisting of single or plural finder lenses (not shown), for viewing an object image formed on the focusing screen. The focusing screen 105, the penta prism 112, and the finder lens 109 constitute a finder optical system.

On the back (image surface side) of the half mirror 111, a movable sub-mirror 122 is arranged to reflect light beams that are close to the optical axis L1 among the light beams transmitted through the half mirror 111, and lead the beams to a focus detection unit 121. The sub-mirror 122 rotates on a central rotation axis provided on a half mirror holding member (not shown), and moves in conjunction with movement of the half mirror 111. Note that the focus detection unit 121 performs focus detection according to a phase difference detection method, by receiving light beams from the sub-mirror 122.

A light path division system, consisting of the half mirror 111 and the sub-mirror 122, can take the first light path division state for directing light to the finder optical system, and the second light path division state which is moved back from the photographing light path (position shown by dashed lines 111' and 122') for directly leading light beams from the image forming lens (not shown) to the solid-state image capturing device 15.

Numeral 114 denotes a movable flash emission unit that can be moved between a storage position where the unit 114 is stored in the D-SLR100 and the light emission position where the unit 114 is projected from the D-SLR100. Numeral 50 denotes a focal plane shutter that adjusts a light amount incident upon an image surface. Numeral 119 denotes a main switch for starting the D-SLR100.

Numeral 120 denotes a release button depressed in two stages. With a half-stroke operation (SW1 is turned on), a photograph preparation is started (photometry operation, focus adjusting operation and the like). With a full-stroke operation (SW2 is turned on), a photograph operation is started (image data read from the solid-state image capturing device 15 is recorded in a recording medium).

Numeral 123 denotes a mode selection switch for switching the D-SLR100 from an image capturing mode for performing image capturing of an object to a cleaning mode for removing dust attached to the surface of the optical element 11. Numeral 180 denotes an optical finder data display unit for displaying particular data on the focusing screen 105.

Figure 8:
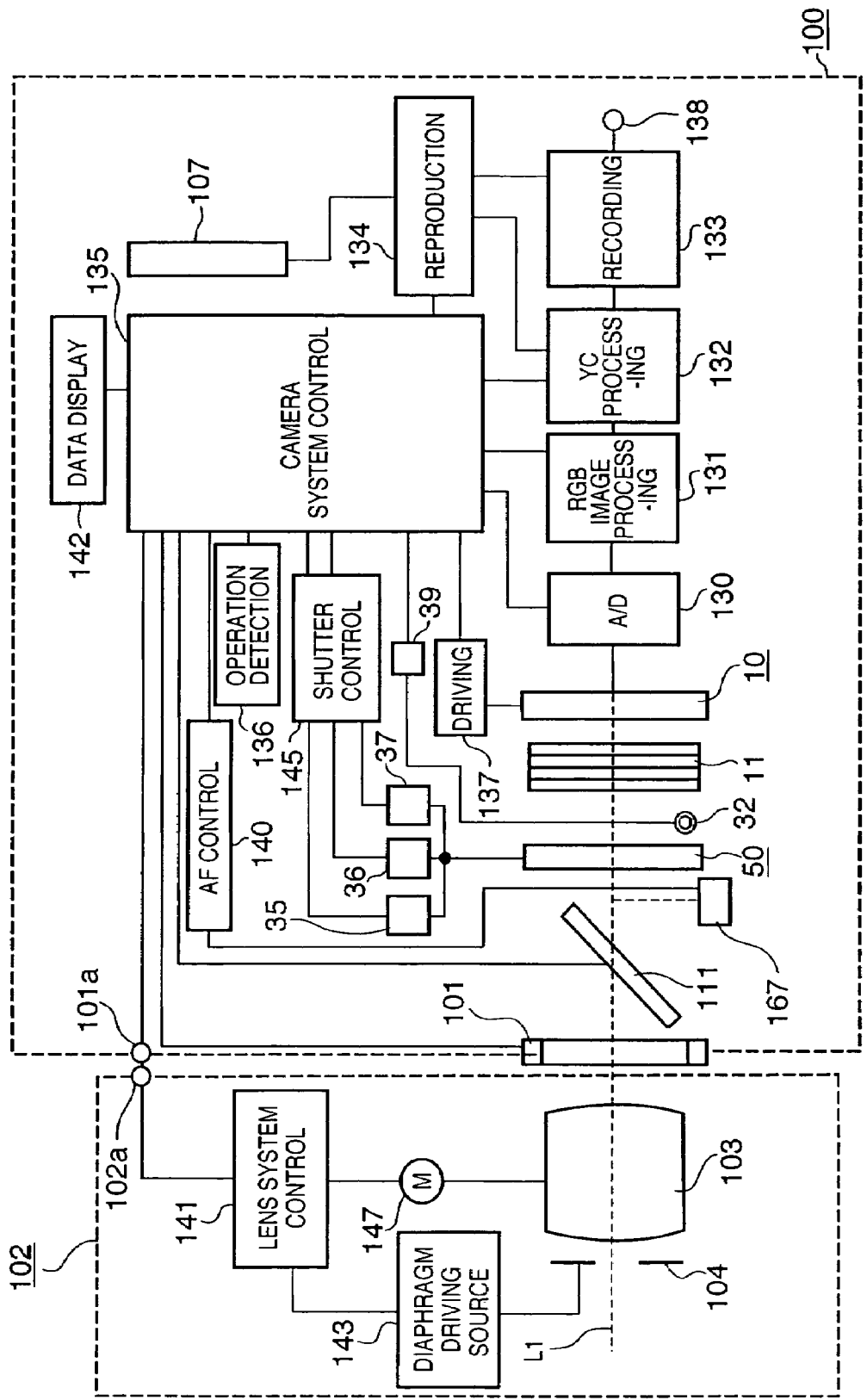
FIG. 8 is a block diagram showing an electric construction of the camera system D-SLR100.

FIG. 8 is a block diagram showing an electric construction of the camera system D-SLR100 according to this embodiment. To the members described in FIG. 7, the same reference numerals are assigned. First, units related to image capturing of an object image and recording are described.

The camera system comprises an image capturing system, an image processing system, a recording/reproduction system, and a control system. The image capturing system comprises the photographing optical system 103 and the solid-state image capturing device 15. The image processing system comprises an A/D converter 130, an RGB image processor 131, and a YC processor 132. The recording/reproduction system comprises a recording processor 133 and a reproduction processor 134. The control system comprises a camera system controller (control means) 135, an operation detector 136, and an image capturing device driving circuit 137.

Numeral 138 denotes a standardized connection terminal for data transmission and reception, which is connected to an external computer or the like. The above-described electric circuits are driven by receiving power supplied from a small fuel cell (not shown).

The image capturing system is an optical processing system that forms an image, based on light from an object, on an image capturing surface of the solid-state image capturing device 15 through the photographing optical system 103. By controlling driving of a diaphragm 104 provided in the photographing optical system 103 and by driving the focal plane shutter 50 through a shutter controller 145 upon necessary, an appropriate amount of light from the object can be received by the solid-state image capturing device 15.

Employed as the solid-state image capturing device 15 is an image capturing element having a total of about ten-million pixels, in which 3700 tetragonal pixels are arranged in the long-side direction and 2800 tetragonal pixels are arranged in the short-side direction. For each pixel, R (red), G (green), and B (blue) color filters are alternately arranged, constituting a so-called Bayer pattern having four pixels in one set.

In the Bayer pattern, G pixels, to which a viewer is strongly sensitive when he/she looks at an image, are arranged more than R and B pixels, thereby improving overall image quality. Generally in image processing utilizing an image capturing element of the Bayer pattern, luminance signals are mainly generated by G pixels, and color signals are generated by R, G, and B pixels.

The signals read from the solid-state image capturing device 15 are supplied to the image processing system through the A/D converter 130. By performing image processing in the image processing system, image data is generated.

The A/D converter 130 is a signal conversion circuit that converts output signals from the solid-state image capturing device 15 to, e.g., 10-bit digital signals in accordance with the signal amplitude read out of each pixel of the solid-state image capturing device 15. Thereafter, image processing is executed by digital processing.

The image processing system is a signal processing circuit that obtains image signals in a desired form based on R, G, and B digital signals. R, G, and B color signals are converted to a luminance signal Y, and a YC signal expressed with color difference signals (R-Y) and (B-Y).

The RGB image processor 131 is a signal processing circuit that processes output signals of the A/D converter 130. The RGB image processor 131 comprises a white balance circuit, a gamma correction circuit, and an interpolation calculation circuit that performs interpolation calculation to realize high resolution.

The YC processor 132 is a signal processing circuit that generates a luminance signal Y and color difference signals R-Y and B-Y. The YC processor 132 comprises a high-frequency luminance signal generator generating a high-frequency luminance signal YH, a low-frequency luminance signal generator generating a low-frequency luminance signal YL, and a color difference signal generator generating color difference signals R-Y and B-Y. The luminance signal Y is formed by synthesizing the high-frequency luminance signal YH and the low-frequency luminance signal YL.

The recording/reproduction system is a processing system that outputs image signals to a memory (not shown) and outputs image signals to the display unit 107. The recording processor 133 performs image signal writing to and reading from the memory. The reproduction processor 134 reproduces image signals read from the memory, and outputs the signals to the display unit 107.

Also, the recording processor 133 comprises a compression/decompression circuit which compresses YC signals, indicative of still image data or moving image data, in a predetermined compression form, and which decompresses the compressed data. The compression/decompression circuit has a frame memory for signal processing. The YC signals from the image processing system are stored in the frame memory in units of frame. By reading the stored signals from each block of a plurality of blocks, signals are compressed and encoded. Compression encoding is realized by performing, e.g., two-dimensional orthogonal transformation, normalization, and Huffman coding on the image signal for each block.

The reproduction processor 134 is a circuit that converts the luminance signal Y and color difference signals R-Y and B-Y to, e.g., R, G, and B signals by matrix conversion. The signals converted by the reproduction processor 134 are outputted to the display unit 107 and displayed (reproduced) as a visible image. The reproduction processor 134 and the display unit 107 may be connected via wireless communication such as Bluetooth. By this configuration, an image captured by the camera can be monitored in a distant location.

Meanwhile, the operation detector 136 in the control system detects an operation of the main switch 119, the release button 120, the mode selection switch 123 and the like (other switches are not shown), and outputs the detection result to the camera system controller 135.

The camera system controller 135 receives a detection signal from the operation detector 136, and performs an operation according to the detection result. Also, the camera system controller 135 generates a timing signal when an image capturing operation is performed, and outputs the signal to the image capturing device driving circuit 137.

The image capturing device driving circuit 137 receives a control signal from the camera system controller 135, and generates a driving signal for driving the solid-state image capturing device 15. A data display circuit 142 receives a control signal from the camera system controller 135, and controls driving of the optical finder data display unit 180.

The control system controls driving of the image capturing system, image processing system, and recording/reproduction system in accordance with an operation of various switches provided on the D-SLR100. For instance, when the SW2 is turned on by an operation of the release button 120, the control system (camera system controller 135) controls driving of the solid-state image capturing device 15, an operation of the RGB image processor 131, compression of the recording processor 133, and so on. Furthermore, the control system controls driving of the optical finder data display unit 180 through the data display circuit 142, thereby changing the display content (state of the display segment) of the optical finder.

Next, a focus adjusting operation of the photographing optical system 103 is described.

The camera system controller 135 is connected to the AF controller 140. Further, by mounting the lens device 102 to the D-SLR100, the camera system controller 135 is connected to a lens system controller 141 of the lens device 102 through mounting contact points 101a and 102a. The AF controller 140, the lens system controller 141, and the camera system controller 135 mutually communicate data necessary for particular processing.

The focus detection unit 121 (focus detection sensor 167) outputs to the AF controller 140 a detection signal obtained in a focus detection area that is provided in a predetermined position of a photographing screen. Based on an output signal from the focus detection unit 121, the AF controller 140 generates a focus detection signal and detects a focus adjustment state (defocusing amount) of the photographing optical system 103. The AF controller 140 converts the detected defocusing amount to a driving amount of a focus lens, which is a partial element of the photographing optical system 103, and transmits the data regarding the focus lens driving amount to the lens system controller 141 through the camera system controller 135.

When focus adjustment is performed on a moving object, the AF controller 140 takes into consideration, the time lag between the full-stroke of the release button 120 and the start of actual photographing control, and predicts an appropriate focus lens stop position. Data regarding the focus lens driving amount to reach the predicted stop position is transmitted to the lens system controller 141.

Meanwhile, when the camera system controller 135 determines that the luminance of an object is low and that sufficient precision of focus detection cannot be obtained based on an output signal of the solid-state image capturing device 15, the flash emission unit 114, or a white LED and a fluorescent tube provided on the D-SLR100 that are not shown are driven to irradiate the object.

When the lens system controller 141 receives data regarding the focus lens driving amount from the camera system controller 135, it controls driving of the AF motor 147 arranged inside the lens device 102, thereby moving the focus lens through a driving mechanism (not shown) for the aforementioned driving amount in the direction of the optical axis L1. By this operation, the photographing optical system 103 achieves a focused state. Note, as mentioned above, in a case where the focus lens is configured by a liquid lens or the like, the interfacial figure is changed.

Furthermore, when the lens system controller 141 receives data regarding an exposure value (aperture value) from the camera system controller 135, it controls driving of a diaphragm driving actuator 143 of the lens device 102, thereby operating the diaphragm 104 to the aperture stop according to the aperture value.

When the shutter controller 145 receives data regarding shutter speed from the camera system controller 135, it controls driving of the charge lever 27 and the driving sources 26, 28 and 29 serving as driving sources of the front blade 21 and the rear blade 22 of the focal plane shutter 50, thereby causing the front blade 21 and the rear blade 22 to operate at above-described shutter speed.

By virtue of the operation of the focal plane shutter 50 and the diaphragm 104, an appropriate amount of object light can be directed to the image-surface side.

When the AF controller 140 detects that an object is in focus, this information is transmitted to the camera system controller 135. In this state, if the SW2 is turned on by full-stroke operation of the release button 120, a photographing operation is performed by the image capturing system, the image processing system, and the recording/reproduction system as described above.

Figure 9:
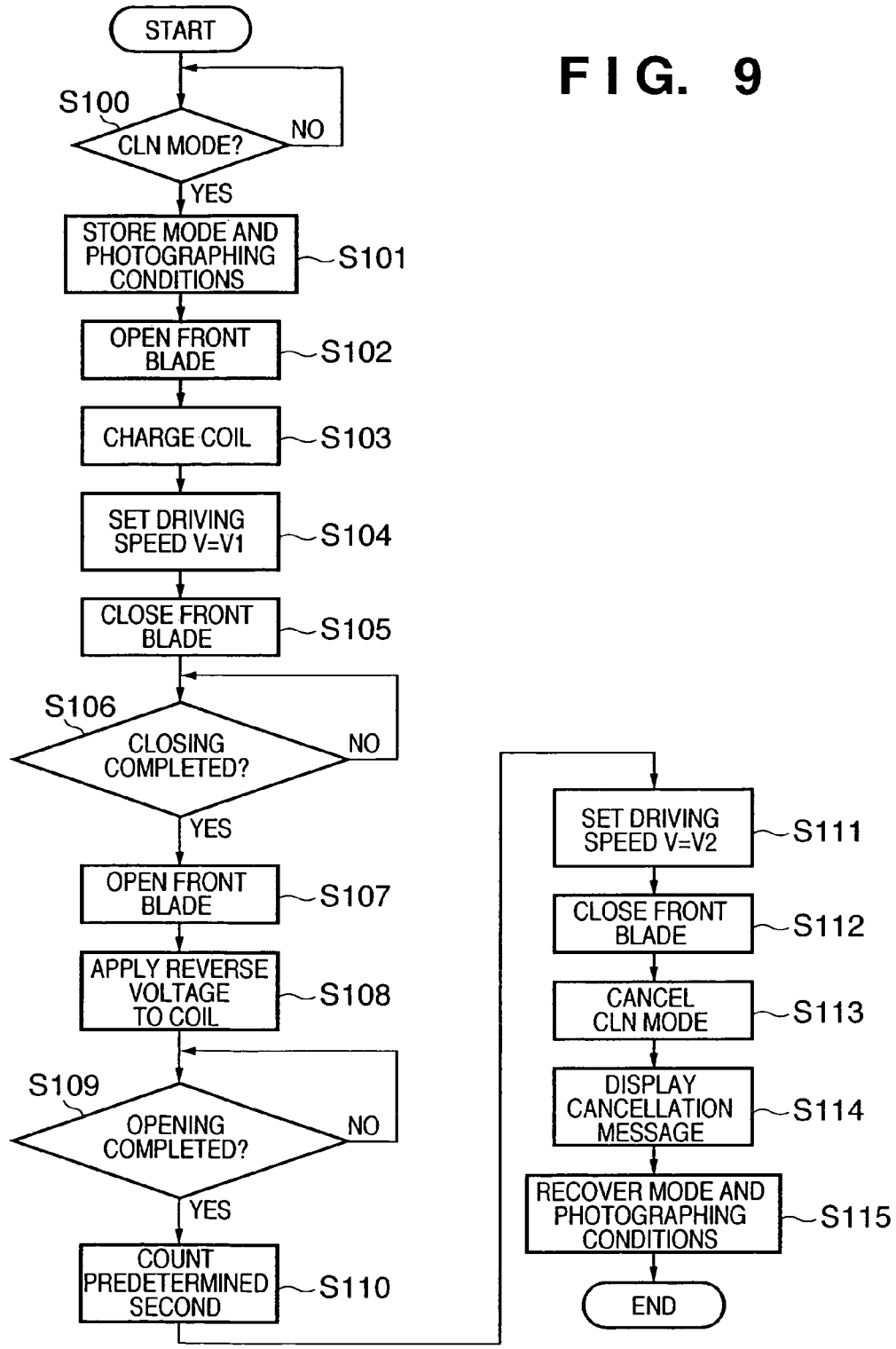
FIG. 9 is a flowchart for describing an operation of the D-SLR100 in cleaning mode according to the first embodiment of the present invention.

Referring to FIGS. 5, 6 and 9, an operation of respective members, e.g., the front blade 21, in the cleaning mode is described.

In step S100, the camera system controller 135 detects whether or not a cleaning (CLN) mode is set by an operation of the mode selection switch 123 of the D-SLR100. When the mode selection switch 123 is operated and the camera system controller 135 detects that the D-SLR100 is shifted to the cleaning mode, the control proceeds to step S101.

In step S101, photographing conditions, e.g., shutter speed, an aperture value or the like, that are set in the D-SLR100 before it is shifted to the cleaning mode are stored in a memory (not shown) of the camera system controller 135, then the control proceeds to step S102.

In step S102, the front blade driving source 35 is operated to perform an opening operation of the shutter blades 21a to 21d of the front blade 21, and the front blade 21 is fully opened. Then the control proceeds to step S103.

In step S103, a predetermined voltage is applied to the coil 32 to electrostatically charge the insulator 31 integrated with the shutter blade 21a of the front blade 21.

Substantially simultaneously to step S103, in step S104, the camera system controller 135 transmits to the shutter controller 145, a command to set the driving speed V of the front blade 21 to V1. By this, the charge driving source 36 is set in a way that the front blade 21 performs closing operation at the set speed V1. Note that the set speed V1 is slower than the open/close operation speed (set speed V2 which will be described later) of the front blade 21 in the image capturing mode of the D-SLR100. This is because it is advantageous to have a slow moving speed of the insulator 31 when the dust 30 attached to the surface of the optical element 11 is pulled by the insulator 31 in the next step S105.

In step S105, the front blade 21 is closed at the speed V1 set in step S104. Since the insulator 31 is electrostatically charged in this stage, if the dust 30 is attached to the surface of the optical element 11, electrostatic force is generated between the dust 30 and the insulator 31, as the dust is electrostatically charged as mentioned above. Since the insulator 31 is fixed to the shutter blade 21a of the front blade 21, the dust 30 is pulled to the insulator 31 by the electrostatic force (electrostatic absorption) against the adherent force between the dust 30 and the surface of the optical element 11. The dust pulled to the insulator 31 by the electrostatic force or the like keeps staying on the surface of the insulator 30.

In step S106, detection means (not shown) provided in the focal plane shutter 50 detects whether or not all the closing operation of the respective shutter blades 21a to 21d of the front blade 21 has been completed. When it is detected in step S106 that all the closing operation of the respective shutter blades 21a to 21d of the front blade 21 has been completed, the control proceeds to step S107.

In step S107, an opening operation of the front blade at speed V1 set in step S104 is started by driving the front blade driving source 35.

In step S108, a reverse voltage of the voltage applied in step S103 is applied to the coil 32.

In step S109, detection means (not shown) provided in the focal plane shutter 50 detects whether or not all the opening operation of the respective shutter blades 21a to 21d of the front blade 21 has been completed. When it is detected in step S109 that all the opening operation of the respective shutter blades 21a to 21d of the front blade 21 has been completed, the control proceeds to step S110.

Since a reverse voltage of the voltage applied in step S103 is applied to the coil 32 in step S108, when the insulator 31 is pressed against the coil 32 by the opening operation of the front blade 21 in step S109, the insulator 31 is neutralized. By this neutralizing operation, the electrostatic force acting between the dust 30 and the insulator 31 is lost, and the dust 30 that has been attached to the surface of the insulator 31 by the electrostatic force is detached from the surface of the insulator 31 due to gravitation and captured by an absorption unit 33b provided on the surface of the stopper rubber 33. By virtue of this, the dust 30 removed from the surface of the optical element 11 does not drift around in the body of the D-SLR100, thus preventing the dust from reattaching to the surface of the optical element 11.

In step S110, a timer unit (not shown) incorporated in the camera system controller 135 performs counting of a predetermined second. This is to prevent the dust 30 from drifting around the focal plane shutter 50 and reattaching to the surface of the optical element 11 by performing the closing operation of the front blade 21 before the dust 30 detached from the surface of the insulator 31 in step S109 is captured by the absorption unit 33b.

In step S111, the camera system controller 135 transmits to the shutter controller 145, a command to set the driving speed V of the front blade 21 to V2 which is the normal opening/closing speed. By this, the charge driving source 36 is set in a way that the front blade 21 performs closing operation at the set speed V2.

In step S112, the charge driving source 36 is driven at speed V2 set in step S111 to perform closing operation of the front blade 21.

In step S113, the cleaning mode is canceled upon completion of the closing operation of the front blade 21 in step S112. At the same time, in step S114, a message indicative of cancellation of the cleaning mode (or completion of the cleaning operation) is displayed on the display unit 107.

Thereafter, in step S115, the D-SLR100 recovers the photographing conditions stored in step S101, and the series of sequence ends.

According to the above-described configuration, it is possible to realize an optical device that can remove dust attached to the optical element surface without touching the optical element.

Furthermore, since the insulator for removing dust attached to the optical element surface is integrated with the shutter blade constituting the front blade, not only a separate driving member is unnecessary to drive the insulator, but also special space for the coil is virtually unnecessary because the coil for electrostatically charging or neutralizing the insulator is arranged in the space between the focal plane shutter and the optical element. Therefore, it is possible to realize an optical device that can remove dust attached to the optical element surface without enlarging the size of the optical device.

Moreover, because dust attached to the optical element surface can be removed by simply setting the optical device in the cleaning mode, it is possible to realize an optical device that can remove dust with a simple operation. Still further, it is possible to realize an optical device that can remove dust attached to the optical element surface and prevent the dust from reattaching to the optical element surface.

Second Embodiment

Besides the electrostatic force, there is force acting when the dust 30 is attached to the insulator 31. Therefore, even if the insulator 31 is neutralized by the coil 32 and the electrostatic force is removed, there is a possibility that the dust 30 does not fall on the absorption unit 33b of the stopper rubber 33 by gravitation only and remains on the surface of the insulator 31. In view of this, the second embodiment describes a method of reliably capturing by the absorption unit 33b the dust 30 removed from the surface of the optical element 11.

The construction of the D-SLR100 according to the second embodiment is exactly the same as that of the first embodiment. Only the driving sequence of the front blade 21 after the D-SLR100 is shifted to the cleaning mode is different from the first embodiment. Hereinafter, an operation of the D-SLR100 in the cleaning mode according to the present embodiment is described with reference to the flowchart in FIG. 10.

The processing from step S200 up to step S207, where the front blade 21 starts its opening operation by driving the front blade driving source 35, is identical to the processing from step S100 to step S107. Therefore, a description thereof is omitted.

In step S208, detection means (not shown) provided in the focal plane shutter 50 detects whether or not all the opening operation of the respective shutter blades 21a to 21d of the front blade 21 has been completed. When it is detected in step S208 that all the opening operation of the respective shutter blades 21a to 21d of the front blade 21 has been completed, the control proceeds to step S209.

In step S209, a reverse voltage of the voltage applied in step S203 is applied to the coil 32, thereby neutralizing the insulator 31. By this neutralizing operation, the electrostatic force acting between the dust 30 and the insulator 31 is lost, and part of the dust 30 that has been attached to the surface of the insulator 31 by the electrostatic force is detached from the surface of the insulator 31 due to gravitation and captured by an absorption unit 33b provided on the surface of the stopper rubber 33. By virtue of this, the dust 30 removed from the surface of the optical element 11 does not drift around in the body of the D-SLR100, thus preventing reattachment of the dust to the surface of the optical element 11.

In step S210, the charge driving source 36 is driven without changing the speed V1 set in step S204, to start a closing operation of the front blade 21.

In step S211, a timer unit (not shown) incorporated in the camera system controller 135 performs counting of a predetermined second. This is to prevent the dust 30 from drifting around the focal plane shutter 50 and reattaching to the surface of the optical element 11 by performing the closing operation of the front blade 21 before the dust 30 detached from the surface of the insulator 31 in step S203 is captured by the absorption unit 33b.

In step S212, the closing operation of the front blade 21 is stopped. In this stage, the front blade 21 is closed for a predetermined amount (e.g., the state where the front blade is closed intermediately as shown in FIGS. 5 and 6).

In step S213, the camera system controller 135 transmits to the shutter controller 145, a command to set the driving speed V of the front blade 21 to V3, which is a speed faster than the open/close operation speed V1 set in step S204. By this, the front blade driving source 35 is set in a way that the front blade 21 performs an opening operation at the set speed V3.

In step S214, the front blade driving source 35 is driven at speed V3 set in step S213, and an opening operation of the front blade 21 is performed. By this operation, the shutter blade 21a of the front blade 21 hits the stopper member 33a of the stopper rubber 33 at a speed faster than speed V2. By this impact, the dust 30 remaining on the surface of the insulator 31 in step S209 is detached from the insulator 31 and captured by the absorption unit 33b. By virtue of this, the dust 30 removed from the surface of the optical element 11 does not drift around in the body of the D-SLR100, thus preventing the dust from reattaching to the surface of the optical element 11.

In step S215, detection means (not shown) provided in the focal plane shutter 50 detects whether or not all the opening operation of the respective shutter blades 21a to 21d of the front blade 21 has been completed. When it is detected in step S215 that all the opening operation of the respective shutter blades 21a to 21d of the front blade 21 has been completed, the control proceeds to step S216.

The operation from steps S216 to S221 is identical to that of steps S110 to step S115; thus, a description thereof is omitted. By the above, the series of sequence ends.

According to the above-described configuration, it is possible to realize an optical device that can remove dust attached to the optical element surface without touching the optical element.

Furthermore, since the insulator for removing dust attached to the optical element surface is integrated with the shutter blade constituting the front blade, not only a separate driving member is unnecessary to drive the insulator, but also special space for the coil is virtually unnecessary because the coil for electrostatically charging or neutralizing the insulator is arranged in the space between the focal plane shutter and the optical element. Therefore, it is possible to realize an optical device that can remove dust attached to the optical element surface without enlarging the size of the optical device.

Moreover, because dust attached to the optical element surface can be removed by simply setting the optical device in the cleaning mode, it is possible to realize an optical device that can remove dust with a simple operation. Still further, it is possible to realize an optical device that can remove dust attached to the optical element surface and prevent the dust from reattaching to the optical element surface.

Note that although the present embodiment has described a method of removing dust attached to the surface of an optical element, the present invention is not limited to this. It goes without saying that the present invention is also applicable to a digital camera where the cover glass surface of the solid-state image capturing device is visible through an aperture of the focal plane shutter.

Figure 11:
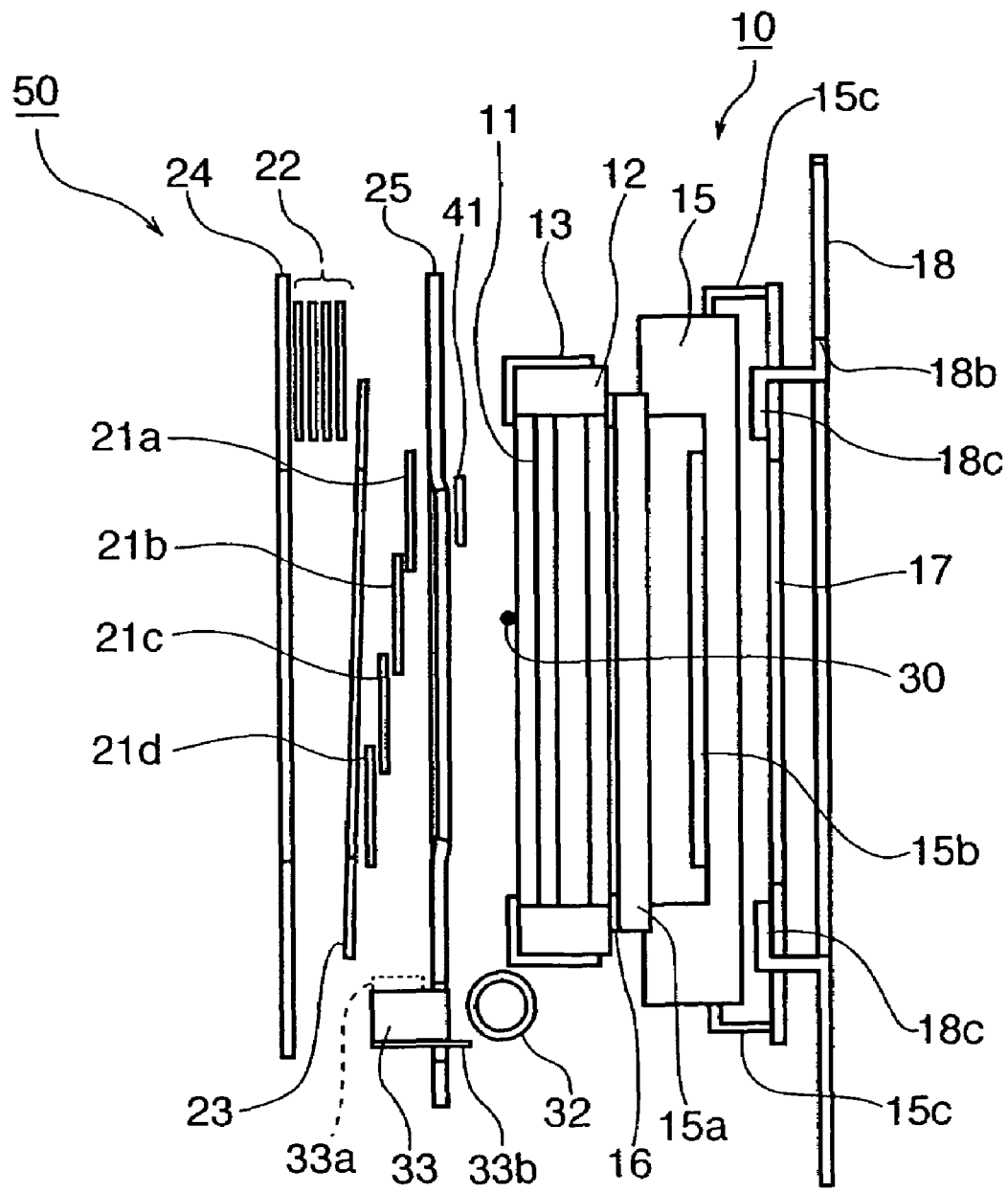
FIG. 11 is a cross-section seen from the side for describing a brief configuration of the image capturing unit 10 and the focal plane shutter 50, showing a modification of the present invention.

Further, in the present embodiment, although the insulator 31 for absorbing the dust 30 is integrated with the shutter blade 21a of the front blade 21, the present invention is not limited to this. For instance, in a case where an insulator is provided as a separate body between the focal plane shutter 50 and the optical element 11 as shown in FIG. 11, the insulator 41 is electrostatically charged or neutralized by the coil 32, and driven by the front blade driving source 35 (other driving source may be provided), thereby enabling removal of the dust 30 attached to the surface of the optical element 11 and capturing of the dust by the absorption unit 33b of the stopper rubber 33. In the case of such construction, a processing sequence similar to the front blade of the present embodiment can realize removal of the dust 30.

Figure 12:
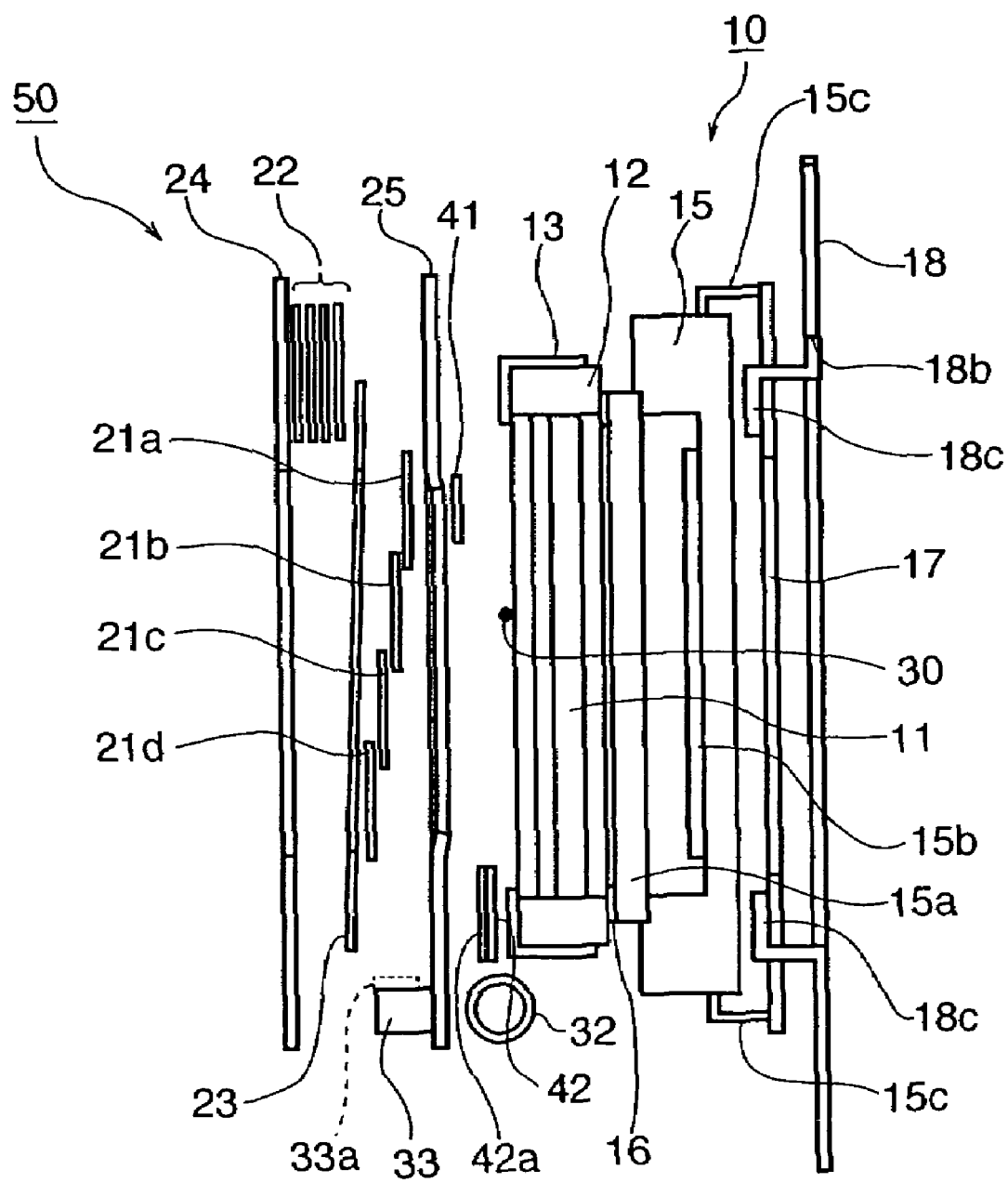
FIG. 12 is a cross-section seen from the side for describing a brief configuration of the image capturing unit 10 and the focal plane shutter 50, showing a modification of a dust absorption member according to the present invention.

Moreover, although the present embodiment has described that the dust 30 absorbed by the insulator 31 or 41 is captured by the absorption unit 33b provided on the stopper rubber 33, the present invention is not limited to this. For instance, as shown in FIG. 12, a conductive member 42 having an adhesive absorption unit 42a on its surface may be arranged in the neighborhood of the full-open position of the front blade 21. When a reverse voltage is applied to the coil 32 in step S108 or step S209, a voltage is also applied to the conductive member 42 to electrostatically charge the absorption unit 42a, thereby causing electrostatic force to act between the dust 30 and the absorption unit 42a.

By the generated electrostatic force, the dust 30 is pulled and detached from the surface of the insulator 31 or 41, then captured by the absorption unit 42a of the conductive member 42. This enables to prevent reattachment of the dust 30. Accordingly, the similar effects to the above-described contents of the present invention can be achieved.

Furthermore, although the present embodiment has described that the coil 32 is employed to electrostatically charge or neutralize the insulator 31 or 41, the present invention is not limited to this. For instance it goes without saying that the insulator 31 or 41 can be electrostatically charged or neutralized by corona discharge which is generated by applying a voltage to a wire electrode.

Moreover, the relative positional relations of the front blade 21, the rear blade 22, the insulator 41, the coil 32, and the stopper rubber 33 are not limited to the positional relations described in the present embodiment. The positional relation of the front and back with respect to the optical axis of the front blade and the rear blade as well as the positional relation of the top and bottom with respect to the optical axis are arbitrary as long as the insulator 41 is on a shutter blade that is movable in the substantially entire area of the light entering surface among the shutter blades facing the optical element 11. In a case where the shutter blades open in the direction of top to bottom with respect to the optical axis direction, the coil and the stopper rubber are arranged at the bottom. In a case where the shutter blades open from the bottom to the top, the coil and the stopper rubber are arranged at the top. However, considering that the dust falls downward by gravitation, it is preferable that the coil and the stopper rubber be arranged at the bottom.

Figure 10:
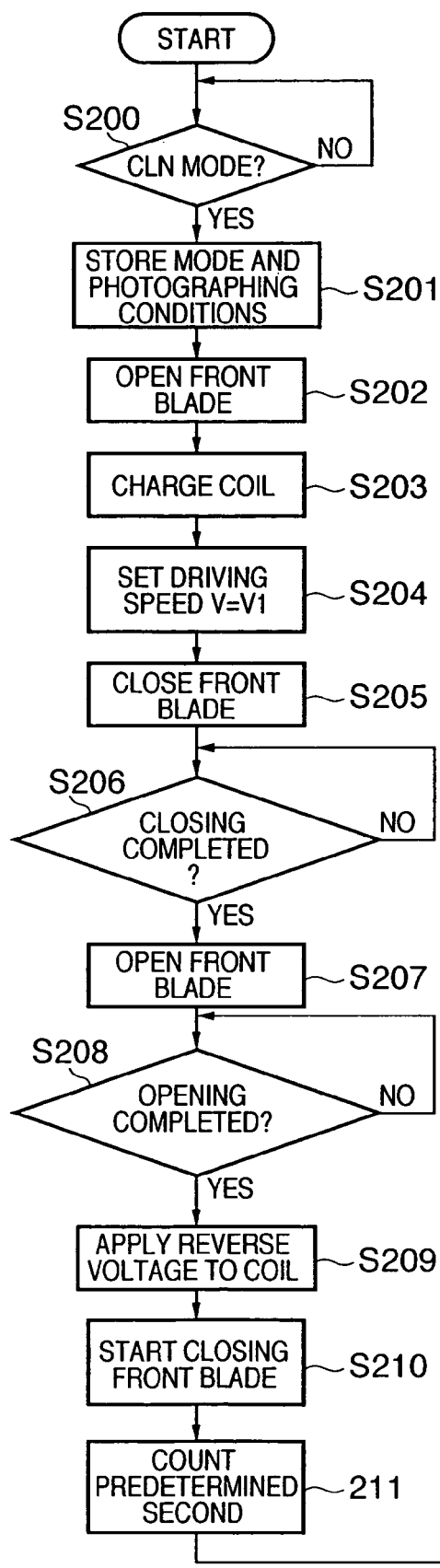
FIG. 10 is a flowchart for describing an operation of the D-SLR100 in cleaning mode according to the second embodiment of the present invention.
Figure 10:
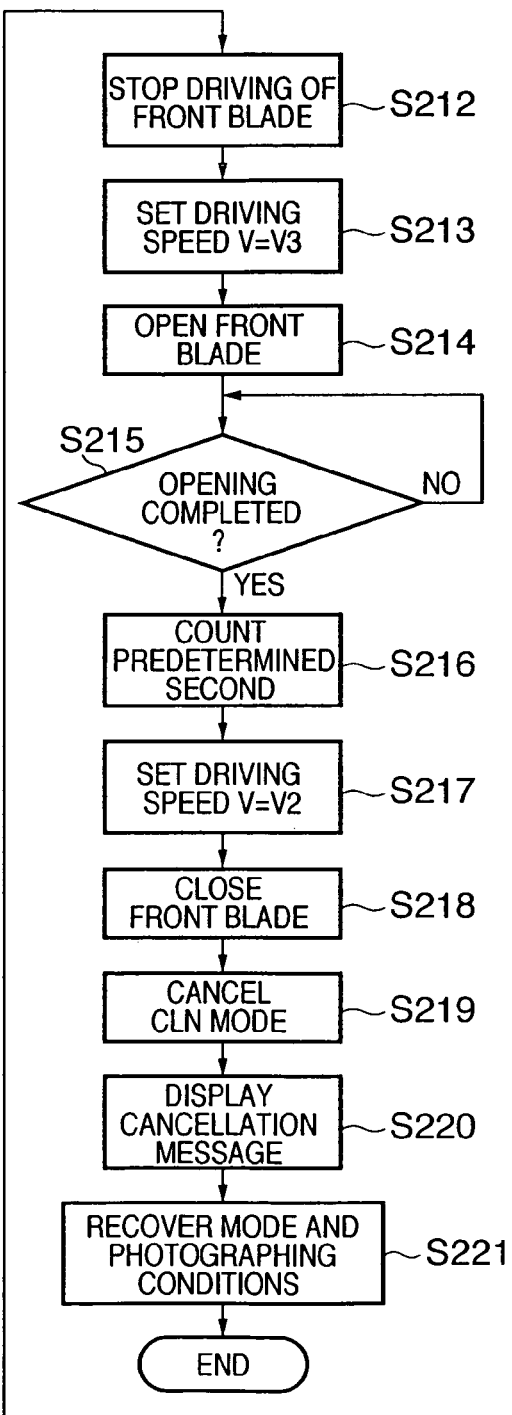

In a case where the relative positional relations of the front blade 21, the rear blade 22, the insulator 41, the coil 32, and the stopper rubber 33 are different from that of the present embodiment, the dust removing flow is not limited to the flowcharts described in FIGS. 9 and 10. For instance, in a case where the insulator faces the coil when the front blade is in a closed state, the insulator is electrostatically charged along with the start of the cleaning mode, then dust is absorbed by an opening operation of the front blade, and neutralizing of the insulator as well as dust removal are executed upon completion of a closing operation of the front blade.

The present invention is not limited to the above embodiment and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-308494 filed on Oct. 22, 2004, the entire contents of which are hereby incorporated by reference herein.

What is claimed is:

1. An optical device comprising:
   a) an image capturing unit configured to convert an incident light beam to an electric signal;
   b) an optical element arranged to be axially forward to an optical axis of said image capturing unit;
   c) a shutter device arranged to axially forward to an optical axis of said optical element, wherein said shutter device is arranged to face with a light beam incident surface of said optical element and have a shutter blade which is movable along the light beam incident surface of said optical element;
   d) an insulation member arranged to the shutter blade; and
   e) an electric control unit provided for at least one of electrostatically charging and neutralizing said insulation member,
   wherein said insulation member electrostatically charged by the electric control unit is moved along the light beam incident surface of said optical element and an alien substance adhering to the light beam incident surface of said optical element is absorbed to the electrostatically charged insulation member,
   wherein the shutter blade can be switched at least between a first operation speed and a second operation speed,
   wherein said optical device can be switched at least between a cleaning mode where the shutter blade is driven to an open state thereby exposing the light beam incident surface of the optical element or the image capturing unit, and an image capturing mode where image capturing of an object is performed, and
   wherein in the cleaning mode said optical device causes the shutter blade to operate at the first operation speed, and in the image capturing mode said optical device causes the shutter blade to operate at the second operation speed.

2. The optical device according to claim 1,
   wherein the shutter blade can further be switched to a third operation speed, which is faster than the first operation speed, and
   in the cleaning mode said optical device causes the shutter blade to operate at the first operation speed, thereafter causes the shutter blade to at least perform an opening operation at the third operation speed.

3. The optical device according to claim 1, further comprising an adhesive member configured to trap the alien substance absorbed to the insulation member when the insulation member is neutralized by the electric control unit, wherein the adhesive member is provided between the shutter blade and the optical element in the neighborhood of a full-open position of the shutter blade.

4. The optical device according to claim 3,
   wherein when the insulation member is neutralized, the adhesive member is electrostatically charged.

5. An optical device comprising:
   a) an image capturing unit configured to convert an incident light beam to an electric signal and have a cover glass;
   b) a shutter device arranged to axially forward to an optical axis of said image capturing unit, wherein said shutter device is arranged to face with a light beam incident surface of the cover glass and have a shutter blade which is movable along the light beam incident surface of the cover glass;
   c) an insulation member arranged to the shutter blade; and
   d) an electric control unit provided for at least one of electrostatically charging and neutralizing said insulation member,
   wherein said insulation member electrostatically charged by the electric control unit is moved along the light beam incident surface of the cover glass and an alien substance adhering to the light beam incident surface of the cover glass is absorbed to the electrostatically charged insulation member,
   wherein the shutter blade can be switched at least between a first operation speed and a second operation speed,
   wherein said optical device can be switched at least between a cleaning mode where the shutter blade is driven to an open state thereby exposing the light beam incident surface of the cover glass or the image capturing unit, and an image capturing mode where image capturing of an object is performed, and
   wherein in the cleaning mode said optical device causes the shutter blade to operate at the first operation speed, and in the image capturing mode said optical device causes the shutter blade to operate at the second operation speed.

6. The optical device according to claim 5,
   wherein the shutter blade can further be switched to a third operation speed, which is faster than the first operation speed,
   wherein in the cleaning mode said optical device causes the shutter blade to operate at the first operation speed, thereafter causes the shutter blade to at least perform an opening operation at the third operation speed.

7. The optical device according to claim 5, further comprising an adhesive member configured to trap the alien substance absorbed to the insulation member when the insulation member is neutralized by said electric control unit, wherein the adhesive member is provided between the shutter blade and the cover glass in the neighborhood of a full-open position of the shutter blade.

8. The optical device according to claim 7, wherein when the insulation member is neutralized, the adhesive member is electrostatically charged.

* * * * *